May 14, 1929.                L. W. SERRELL                1,713,303
                                BROILER
                        Filed Feb. 1, 1928        3 Sheets-Sheet 1
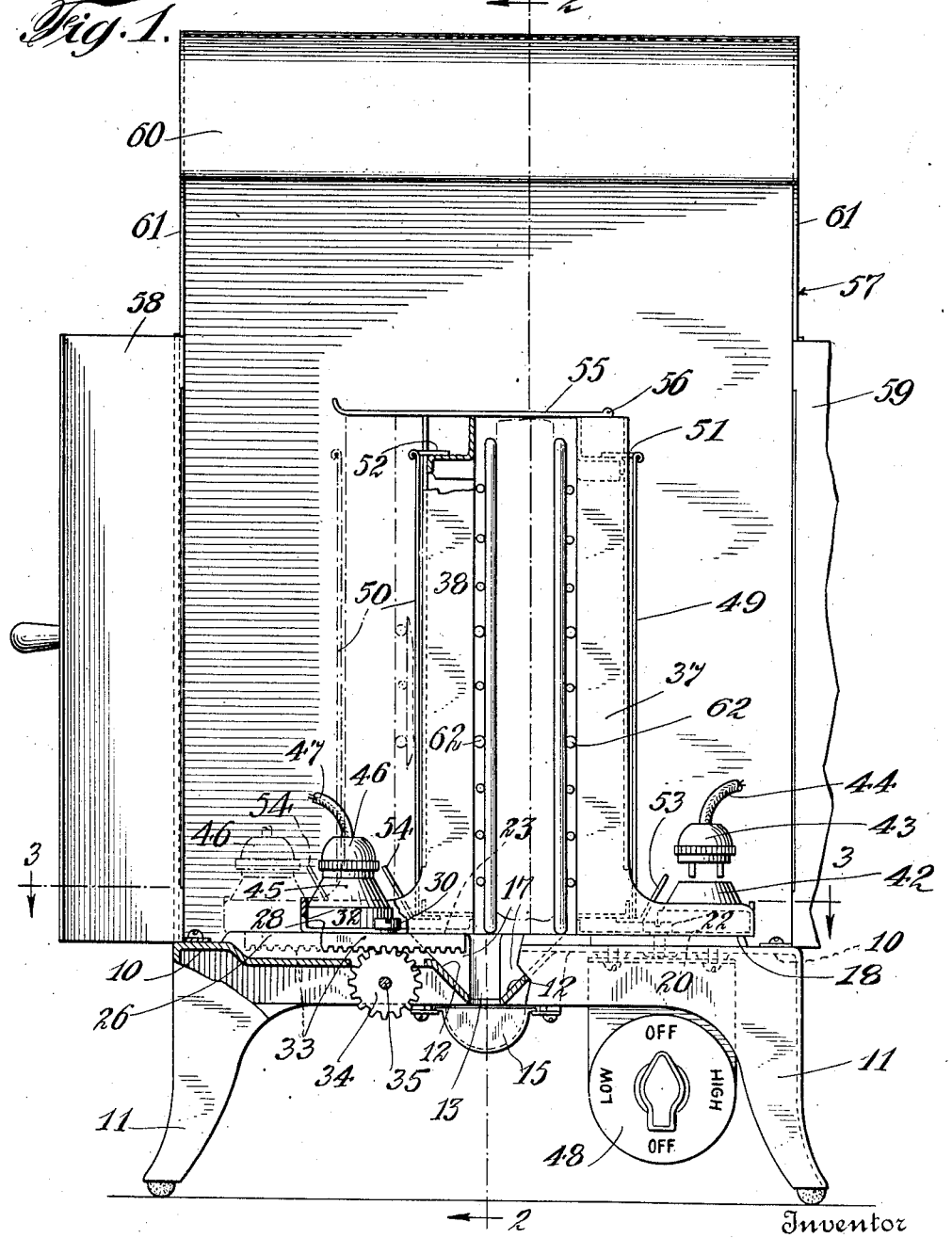
Inventor
Lemuel W. Serrell
By his Attorneys

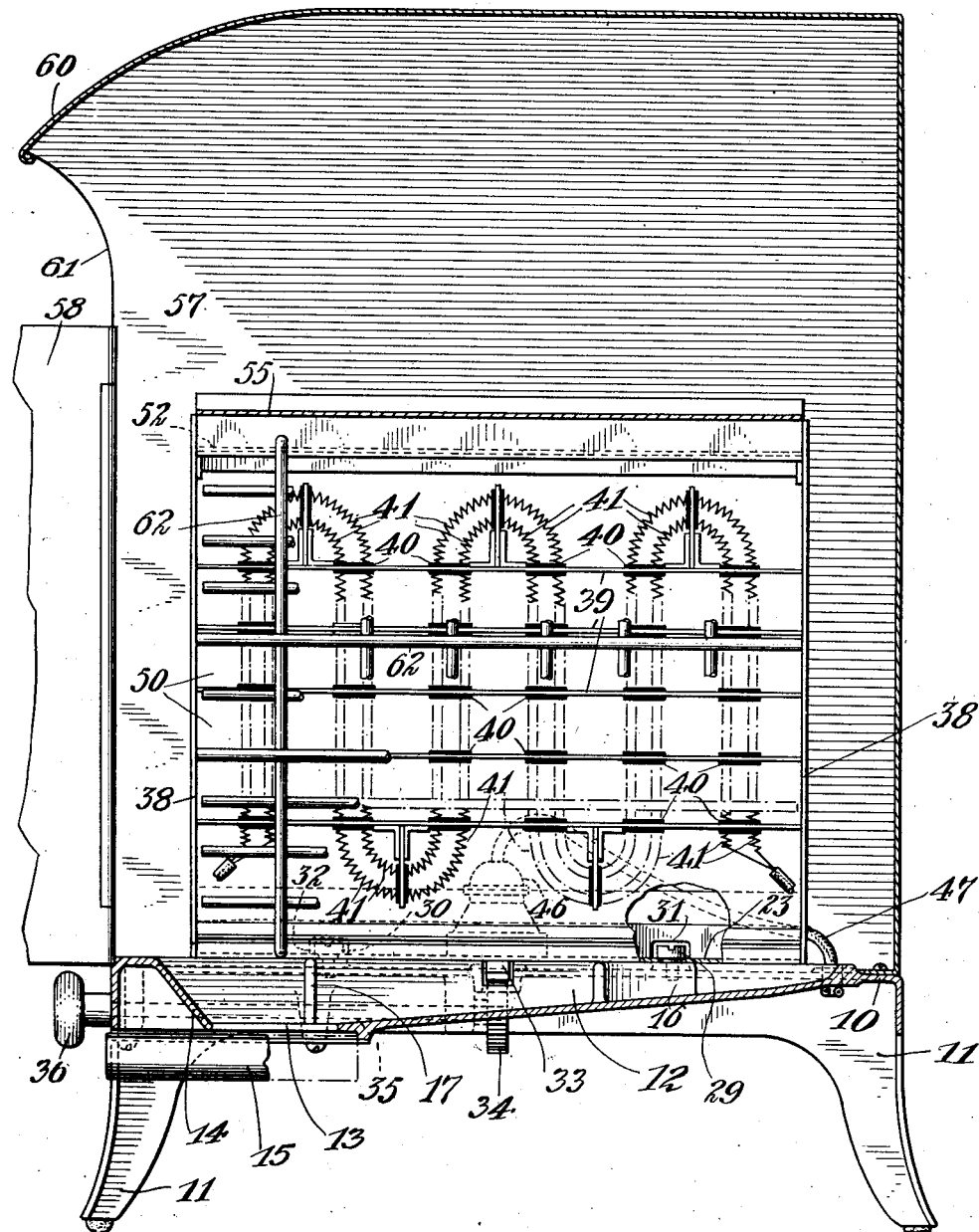

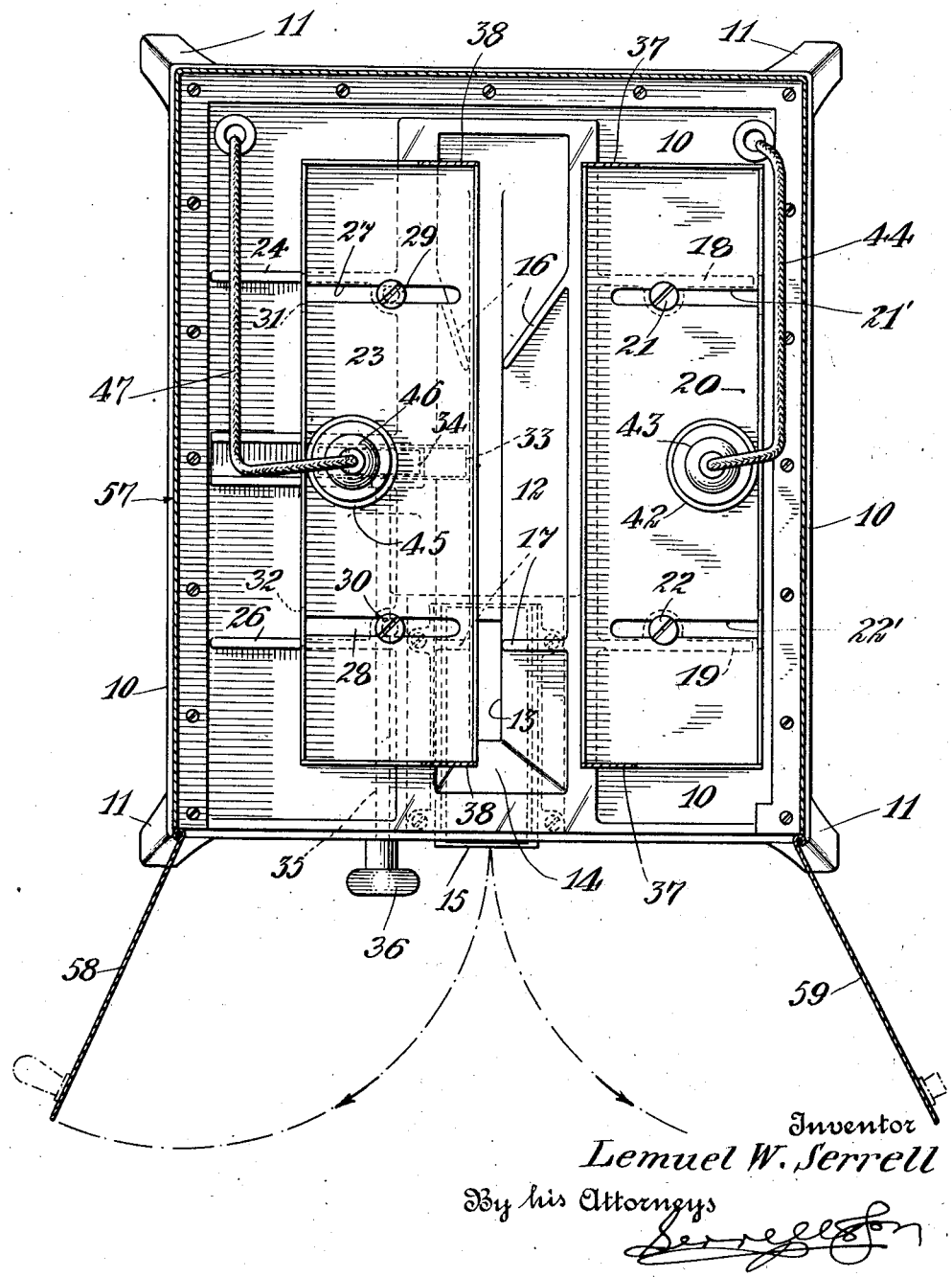

Patented May 14, 1929.

1,713,303

UNITED STATES PATENT OFFICE.

LEMUEL W. SERRELL, OF NEW YORK, N. Y., ASSIGNOR TO SERELCO, INC., OF NEW YORK, N. Y., A CORPORATION OF DELAWARE.

BROILER.

Application filed February 1, 1928. Serial No. 251,066.

In broiling foods the usual practice or custom is to first subject one side of the food and then the other side of the food to a fire, flame or other source of heat and to alternately present the opposite sides of the food to the heater element until it is sufficiently cooked. Obviously, this method of broiling requires constant attention, is one that requires considerable time, and often results in the food being unevenly cooked, that is, cooked more on one side than on the other.

The object of my invention is the provision of a broiler, in the use of which the difficulties and inconveniences to which reference has been made are entirely overcome. In carrying out the invention I employ a plurality of heater elements which are adjustable to position relatively to one another whereby the food placed between them is subjected to a heat simultaneously on both sides whereby the cooking is effected in a uniform manner on both sides of the food and the inconvenience of successively turning the food to subject opposite sides thereof to the heat is eliminated. The heater elements are preferably heated electrically and the heat coils and the devices for supply current are so arranged that an intense heat may be supplied at the beginning of the cooking to quickly sear the outer surfaces of the food, thereby retaining the juices thereof, and subsequently the cooking may be continued until finished by a heat of lesser intensity. The food to be cooked, irrespective of whether it is meat such as steaks, chops, or squabs, or whether it is food of another nature such as fish, or toast and the like, is first placed in a grid and the grid inserted between the heater elements which are then adjusted to position so as to bring the opposite sides of the food into a place in which they are at equal distances from the source of heat. In carrying out the invention the heater elements are preferably mounted on a suitable base and enclosed in a housing wherein there are also employed deflector plates for directing the heat to the food, a heat retainer plate extending across the heater elements, and also means by which the heat is deflected toward the front of the housing in which there are suitable doors for gaining access to the interior thereof as will be hereinafter more particularly described.

In the drawing Figure 1 is an elevation and partial section illustrating a broiler apparatus made in accordance with this invention, Figure 2 is a sectional elevation on line 2—2, Figure 1, and Figure 3 is a sectional plan on line 3—3, Figure 1.

As illustrated in the drawing the preferred form of broiler made in accordance with my present invention may be constructed to include a base 10 mounted upon legs 11 placed at the corners of the base or otherwise, and provided with feet of insulating material. The base is constructed to provide, in a longitudinally disposed position, a trough 12 extending from the front to the rear. The longitudinal sides of this trough are inclined downwardly and the base of the trough inclines downwardly from the rear toward the front of the base. In the front portion of the trough there is an opening 13. The walls 14 at the forward end of the trough, as clearly indicated in the drawing, are formed at a greater inclination than these in the other parts of the trough. Beneath the base I employ a drawer 15 mounted to slide on suitable rails or otherwise, and when in position to lie directly below the opening 13. The walls of the trough are inclined as described for a double purpose, first to direct the juices which may escape from the food being cooked and thence to the drawer, the same being directed by means of suitably placed ribs 16 and 17 which are employed to support a food holding grid while the base of the trough is adapted to direct the heat toward the front of the broiler to which feature reference will be hereinafter more particularly made.

The upper faces of the base on opposite sides of the trough are preferably flat and in the same plane. The upper face of the base at the right hand side thereof, as shown in Fig. 3 is provided with ribs 18 and 19 upon which there rests a plate or tray 20. As illustrated, this plate is provided with a peripheral upstanding flange and is connected to the base by means of screws 21 and 22 or therwise. On the opposite side of the base there is a similarly formed plate or tray 23 which rests upon the ribs 24, 25 and 26 provided in the base for this purpose. This plate 23, however, is adjustable to position, being movable toward and away from the plate 20. In suitably spaced positions the plate 23 is slotted, as indicated at 27 and 28, and is attached to the base by means of screws 29 and 30 which serve as guides for the plate in the movement thereof to position. The outer portion of the peripheral flange of this plate 23 is recessed, as indicated at 31 and 32 for the admission of the heads of the screws 29 and 30. Beneath the plate 23 and preferably in a centrally disposed position the same is fitted with a rack 33. Engaging this rack 33 there is a pinion 34. The pinion is mounted on a spindle 35 and this is journaled in bearings provided therefor in the base. The spindle 35 protrudes beyond the base at the front thereof and at its outer extremity is fitted with a knob or handle 36 by which the spindle may be turned to actuate the pinion and rack and thereby shift the plate 23 to and away from the plate 20 which latter, as will be understood, is preferably secured permanently or in a fixed position to the base while in operation although, of course, it is both slidable and detachable by means of the screws 21 and 22.

Mounted in the plate 20 there is a frame 37 for a heater element and in a similar manner mounted in the plate 23 there is a frame 38 for another heater element. These heater elements are similarly constructed and per se form no part of the invention. The frames, however, of the heater element are provided with cross-bars 39 fitted in any suitable manner with insulators 40 for receiving and retaining heat coils 41. On the plate 23 there is mounted a socket 42 to which the heat coils in the frame 37 are connected and which is adapted to receive a plug 43 for connecting the circuit with these heat coils, the lead from the plug 43 being indicated at 44. In like manner the movable plate 23 is provided with a socket 45 to which the heat coils in the frame 38 are connected and which is adapted to receive a plug 46, the lead from the plug 46 being indicated at 47. The leads 44 and 47, are connected to a suitable switch 48 which in turn is connected to the service lines and by which, as will be understood, the current may be turned on and off to and from the heater elements and may be also controlled in any suitable way to vary the intensity of the heat, for example, the heat coils may be arranged in multiple when a high heat is desired or necessary, and the heat coils may be placed in series when a heat of lesser intensity is desired. As hereinbefore stated, however, these particular features form no part of this invention. An attachable plug is used for each heater element in order that the parts of the broiler may be separated for cleaning and other purposes without interfering with the electrical connections.

Associated with the frame 37 and the heat coils therein I employ a deflector plate 49 and similarly with the frame 38 and the lead coils therein I employ a deflector plate 50. At the ends thereof these deflector plates may be suitably flanged as indicated at 51 and 52 so as to fit over and be supported by the top members of the frames of the heater elements. At their lower ends these deflector plates preferably lie within suitable ledges 53 and 54 connected to the side members of the frames of the heater elements whereby, as will be understood, the deflector plates are normally maintained in position, and may be readily removed for the purposes of cleaning or otherwise. As illustrated, the broiler also preferably includes a heat retainer plate 55 which at one edge may be hinged to a rod or pin 56 mounted in and extending between the side members of the frame 37. This heat retainer plate is adapted to extend across the frames at the top thereof and normally to lie against the upper member of the frame 38 irrespective of the position which this frame may assume.

As illustrated the broiler also includes a housing or hood 57 which surrounds the heater elements and is suitably mounted upon and is secured to the base. In the front wall of the housing the same is provided with doors indicated at 58 and 59. These doors may be mounted upon hinges or otherwise connected to the housing. The upper front portion of the housing, as indicated at 60, preferably overhangs the front walls and beneath the front edge of the top and the upper portions of the doors the front wall of the housing is open, as indicated at 61, for the purposes of ventilation.

The broiler, as hereinbefore described, may be employed for broiling foods of any nature, for making toast, or for other obvious cooking operations. The food to be cooked is preferably placed between the parts of a grid 62. This grid is constructed to receive and retain foods of different kinds although the grid per se forms no part of the invention. After placing the food in the grid the grid is placed between the heater elements and the adjustable heater element shifted to position, depending upon the thickness of the food. It will now be obvious that the deflector plates 49 and 50 direct the heat from the heater element to the outer surfaces of the food to be broiled, while the heat retainer plate 55 retains the greater portion of the heat between the heater elements. It will also be obvious that because of the inclination of the faces in the base there is a tendency to deflect or direct the heat upwardly and forwardly, that is, toward the doors, where, because of the doors being connected to the front walls of the broiler, more of the heat tends to escape than is possible from other portions of the apparatus, particularly in view of the opening in the front wall above the doors for the purpose, as hereinbefore stated, of ventilation and permitting the escape of smoke from the interior of the broiler. It will also be understood that by utilizing an intensive heat at the beginning of the cooking operation the sides of the food to be broiled may be quickly seared and then a lower heat may be utilized until the cooking operation is completed. As hereinbefore stated, any juices that may escape from the food are conserved by being collected in the drawer or tray provided for this purpose beneath the base.

In carrying out the invention I prefer to place the heater elements in a vertical position, as illustrated in the drawing, but in some instances they may be otherwise disposed without departing from the nature and spirit of the invention. However, in the preferred form of the invention as hereinbefore stated the heat elements are placed in a vertically disposed position. It will be apparent that with the heater elements in a vertical position and with the deflector plates in place the heat generated by the heater elements rises in the space between the same tending to cause an accumulated effect of the heat towards the top of the heater elements. This is particularly the case when the heat coils are uniformly placed in the heater elements causing the heat to be generated uniformly therein. Consequently, I prefer to so arrange the coils in the heater elements that a greater heat is generated in the bottom portions than in the top portions. This may be accomplished by placing the heat coils closer together in the bottom portions of the heater elements than in the top portions thereof or by using a greater number of turns of the coils in the bottom portions than in the top portions of the heater elements or otherwise. This arrangement of the heat coils, as will be apparent, insures a more even disposition of the heat over the entire surfaces of the food to be cooked.

It will furthermore be understood that the broiler structure hereinbefore described is so made and the parts so assembled that they may be readily demounted for the purposes of cleansing, it being important from a hygienic standpoint that they be kept clean. This makes it readily possible also to make repairs or to replace any part of the structure. Obviously the structure as disclosed may be varied within the scope of the accompanying claims without departing from the nature and spirit of the invention.

I claim as my invention:

1. In a broiler, a base, a vertically fixed heater element on the base, a heater element movably mounted on the base, means for shifting the movable heater element to position relatively to the fixed heater element, a deflector plate associated with the outer portion of each heater element, and a cover plate extending across the upper portion of the heater elements.

2. In a broiler, a base, a vertically fixed heater element on the base, a heater element movably mounted on the base, means for shifting the movable heater element to position relatively to the fixed heater element, a deflector plate movably connected to the outer portion of each heater element, and a heat retainer plate pivotally mounted in the upper portion of one heater element and adapted to extend between the same and the upper portion of the other heater element.

3. In a broiler, a base, a heater element fixed on the base, a heater element movable to position relatively to the fixed heater element, the said base having a trough therein disposed in a longitudinal position relatively to the cooking space between the heater elements, and a casing mounted on the said base and enclosing the said heater elements.

4. In a broiler, a base, a vertically placed heater element fixed on the base, a vertically placed heater element movably mounted on the base, means for shifting the movable heater element to position relatively to the fixed heater element, the said base having a trough disposed longitudinally relatively to the cooking space between the said heater elements and having its face incline from the rear toward the front of the base with an opening through the base in the front portion of the trough, a drawer carried by the base beneath the opening in the trough, and a casing secured to the base and adapted to enclose the said heater elements.

5. In a broiler, a base, a vertically placed heater element fixed on the base, a vertically placed heater element movable on the base, means for shifting the movable heater element toward and away from the fixed heater element, deflector plates removably attached to the outer portion of each heater element, a heat retainer plate connected to one heater element and adapted to extend over the other heater element, and a housing connected to the base and enclosing the said heater elements, the front wall of the housing including doors for gaining access to the heater elements and the base being provided with a trough with the bottom wall thereof sloping from the rear toward the front of the base for directing the passage of juices which may escape from the food being cooked and also acting as a means for directing the heat toward the front of the broiler.

6. In a broiler, a base, a vertically disposed electric heater element fixed in the base, a vertically disposed electric heater element movable on the said base, means for shifting the movable heater element to and from the fixed heater element, devices for retaining the heat within the cooking space between the said heater elements, separable circuit connections to the said heater elements, and a housing connected to the said base for enclosing the said heater elements.

7. In a broiler, a base, a heater element vertically placed on the base, the heater element also vertically placed and movably mounted on the said base, means for shifting the movable heater element to position, the said base having a trough disposed longitudinally relatively to the cooking space between the said heater elements, a drawer carried by the base beneath the said trough there being an opening in the trough communicating with the drawer, and a casing secured to the base and adapted to enclose the heater elements.

8. In a broiler, a base, a plurality of heater elements, means for adjusting the heater elements on the base relatively to one another, a casing associated with the base for covering the said heater elements, and means in the casing for gaining access to the cooking space between the said heater elements.

9. In a broiler, a base, a plurality of heater elements, means for adjusting the positions of the said heater elements relatively to one another, and devices carried by the said heater elements for retaining the heat within the cooking space between the said heater elements.

10. In a broiler, a base, a heater element frame fixed in position on the base, a heater element frame movably mounted on the base, heater elements mounted in the said heater element frames, means for shifting the movable heater element frame and heater element therein to position relatively to the fixed heater element frame and its heater element, and means detachably associated with and carried by the said heater element frames for retaining the heat within the space between the said heater elements.

11. In a broiler, a base, a heater element vertically fixed on the said base, a heater element movably mounted on the said base, means for shifting the movable heater element to position relatively to the fixed heater element, and a deflector plate associated with the outer portion of each of the said heater elements for retaining the heat within the cooking space between the same.

12. In a broiler, a base, a heater element fixed in a vertical position on the said base, a heater element movably mounted on the said base, means for shifting the movable heater element to position relatively to the fixed heater element, and a heat retainer plate connected to one of the said heater elements at the outer end thereof and extending therefrom to overlap the outer end of the other heater element to direct the heat from the heater elements to the cooking space between the same.

Signed by me this 6th day of January, 1928.

LEMUEL W. SERRELL.